(12) United States Patent
Artsvelyan

(10) Patent No.: US 6,578,914 B2
(45) Date of Patent: Jun. 17, 2003

(54) ADJUSTABLE ARMREST CUSHION

(76) Inventor: Albert Artsvelyan, 3027 El Caminito St., La Crescenta, CA (US) 91214

( * ) Notice: Subject to any disclaimer, the term of this patent is extended or adjusted under 35 U.S.C. 154(b) by 0 days.

(21) Appl. No.: 09/812,190

(22) Filed: Mar. 19, 2001

(65) Prior Publication Data
US 2002/0130538 A1 Sep. 19, 2002

(51) Int. Cl.⁷ ............................................. A47C 27/00
(52) U.S. Cl. ................................. 297/219.1; 297/227
(58) Field of Search ............................ 297/219.1, 225, 297/227, 228.13, 228, 452.56, 452.55, 411.2, 440.11, 452.26, 452.27, 411.23, 218.1, 218.2, 218.3, 219.12, 220; 5/925, 411, 655.9, 699, 646, 738

(56) References Cited

U.S. PATENT DOCUMENTS

| | | | | |
|---|---|---|---|---|
| 1,247,547 A | * | 11/1917 | Eune | 297/411.23 |
| 2,871,928 A | | 2/1959 | Swenson | |
| 3,027,573 A | * | 4/1962 | Bell, Jr. | 5/738 |
| 3,118,153 A | * | 1/1964 | Hood | 5/655.9 X |
| 3,205,514 A | * | 9/1965 | Reynolds | 5/925 X |
| 3,220,767 A | * | 11/1965 | Hendrickson | |
| 3,833,259 A | * | 9/1974 | Pershing | 297/452 |
| 3,950,800 A | * | 4/1976 | Garshfield | 5/738 |
| 4,285,544 A | | 8/1981 | Zapf | |
| 5,048,892 A | | 9/1991 | Ledbetter | |
| 5,332,288 A | | 7/1994 | Coates | |
| 5,403,066 A | * | 4/1995 | Drum | 297/219.1 |
| 5,429,416 A | | 7/1995 | Lofy | |
| 5,588,445 A | * | 12/1996 | Obaidi | 297/230.1 X |
| 5,605,374 A | | 2/1997 | Perry | |
| 5,700,053 A | | 12/1997 | Downing | |
| 5,809,595 A | * | 9/1998 | Stevens et al. | 5/925 X |
| 5,813,727 A | | 9/1998 | Sugawa et al. | |
| 5,934,754 A | | 8/1999 | Raffa | |
| 5,964,506 A | * | 10/1999 | Coates et al. | 297/484 |
| 5,979,987 A | * | 11/1999 | Rich | 297/411.23 |
| 5,988,744 A | * | 11/1999 | Franchak | 297/256.17 |
| 6,073,998 A | * | 6/2000 | Siarkowski et al. | 297/180.12 |
| 6,135,562 A | * | 10/2000 | Infanti | 297/440.2 |

* cited by examiner

*Primary Examiner*—Peter M. Cuomo
*Assistant Examiner*—Stephen Vu
(74) *Attorney, Agent, or Firm*—Christie, Parker & Hale, LLP (57) ABSTRACT

A releasably attachable cushion that can be used with chair armrests, seat armrests, and other types of support structures, to provide extra cushion support for the user's arm. In one embodiment, the cushion has an outer covering and a multi-layer inner structure. The multi-layer inner structure includes at least two layers: a cushion layer and a support layer with the cushion and support layers being enclosed in the outer covering. The support layer is thinner and made of harder material than the cushion layer. In an alternate embodiment, the cushion has an outer covering, a cushion, and a skirt attached to the outer covering. The cushion is enclosed in the outer covering and the skirt has a tightening means so that a user can adjust the tightening means in order to securely apply the cushion of the invention to armrests of various shapes and sizes.

15 Claims, 5 Drawing Sheets

ADJUSTABLE ARMREST CUSHION

BRIEF DESCRIPTION OF THE INVENTION

The present invention relates to cushion and more particularly, to cushions which are removably attachable to an arm of a chair.

BACKGROUND OF THE INVENTION

Armrest cushions are provided on an armrest of a chair to provide comfort and support to users of the chair. Armrest cushions are especially useful and necessary for persons who must sit on a chair for an extended period of time or use a chair that does not provide adequate support and comfort for an extended use.

Often users must sit in a chair to perform a task for an extended period of time. The armrests of chairs are typically made of various hard materials such as plastic and come in various shapes. Because most of the armrests are without any cushion or padding, an extended use of the chairs may cause fatigue and stress to the users, and sometimes cause occupational hazards. Thus it is desirable to provide cushions for the chairs' arms. The problem is more severe for computer users. With the advent of the Internet and computer age, a larger number of the population now use a computer on a daily basis. The computer users often engage in very intensive work sessions that require their continuous presence in front of the computer screens.

Conventional armrest cushions are provided for beach chairs, wheelchairs, and automobile armrests. However, conventional chairs and armrest cushions, even those designed for such purposes, do not provide adequate support and cushion to the computer users. Also, conventional cushions do not provide adequate flexibility and adjustability to the users.

Further, most conventional armrests are designed to work with some specific types of chairs such as beach chairs or wheelchairs. Since they are designed to fit with certain types of chairs, they are often not very flexible and their applicability is limited.

In view of the foregoing, it is highly desirable to provide an armrest cushion that has cushion support and flexibility without losing the necessary rigidity to provide adequate support to the users. It is also desirable to provide an armrest cushion that allows users to adjust the cushion to apply to arms of various sizes and shapes.

SUMMARY OF THE INVENTION

The present invention provides a cushion that can be used with chair armrests, seat armrests, and other types of support structure. The cushion of the present invention is releasably attachable to the armrest or a support structure to provide a cushion support for the user of the armrest or the support structure.

In one embodiment, the present invention provides a cushion for removable attachment to the arm of a chair, comprising an outer covering and a multi-layer inner structure. The multi-layer inner structure includes at least two layers: a cushion layer and a support layer. In a preferred embodiment, the cushion and support layers are enclosed in the outer covering. The support layer is thinner and made of harder material than said cushion.

The cushion has a plurality of straps attached to it so that a user can tighten the straps and secure the cushion on the armrest. In a preferred embodiment, the support layer and the outer covering have holes to accommodate and pass through the straps.

In an alternate embodiment of the invention, the cushion of the invention comprises an outer covering, an inner layer or cushion, and a skirt attached to the outer covering. The inner cushion is enclosed in the outer covering, and the skirt comprises tightening means. In one embodiment, the skirt has tightening means such as a string so that a user can secure the armrest cushion to the armrest without losing cushion support or softness.

The alternate embodiment is flexible and accommodating of various sized and shaped structures or armrests. When the size of the armrest is smaller than the size of the cushion, the user can still use and enjoy the alternate embodiment of the cushion by placing the cushion on the small size armrest and secure the cushion on the armrest by tightening the string. Tightening the string on a smaller size armrest causes the cushion end portions to bend and wrap around the end side of the armrest, providing a well-fit and adjusted cushion support.

BRIEF DESCRIPTION OF THE DRAWINGS

Preferred embodiments of the invention are described below with reference to the accompanying drawings in which.

DETAILED DESCRIPTION OF THE INVENTION

In overview, the present invention provides for a cushion that can be used with chair armrest, seat armrest, and other types of support structure. The cushion of the present invention is releasably attachable to the armrest or a support structure to provide a cushion support for the user of the armrest or the support structure.

The present invention provides an armrest cushion comprising an outer covering and a layered inner structure. The outer covering made of soft fabric has a tightening means attached around the fringe so that the armrest cushion may be applied to armrests of various sizes. When the armrest cushion is applied to a chair that has relatively shorter armrests, the user can pull the tightening means tight and fit the cushion on the shorter armrest and prevent slip-off.

Figure 1:
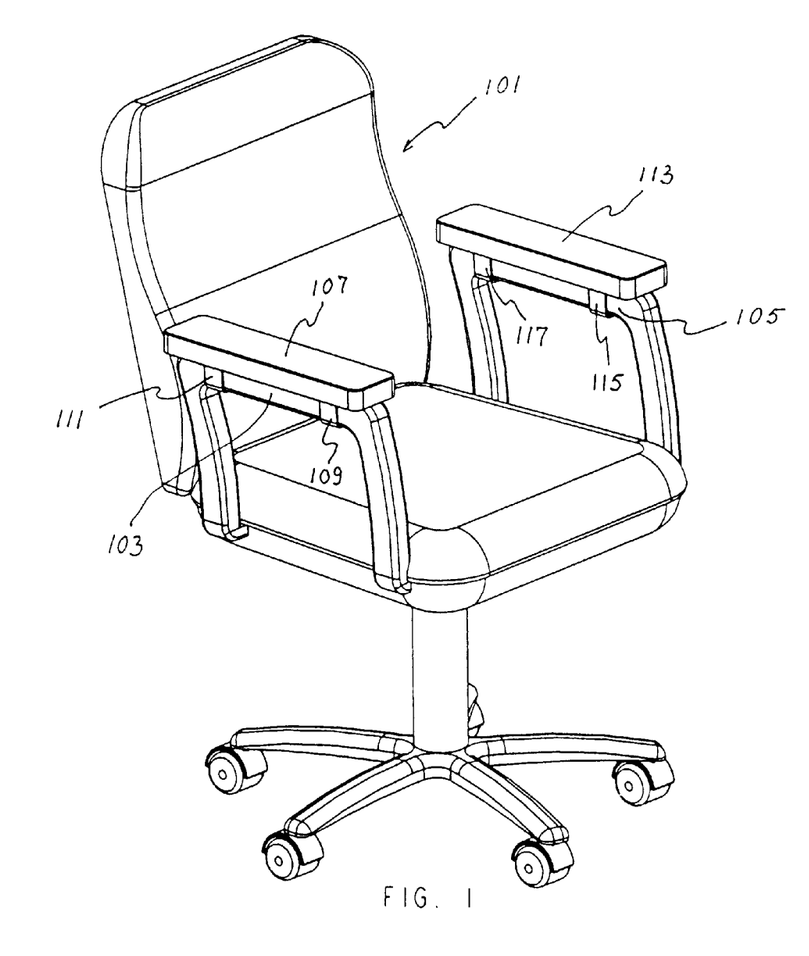
FIG. 1 illustrates a perspective view of an armrest cushion of the invention in conjunction with a chair.

FIG. 1 illustrates a perspective view of an armrest cushion of the invention in conjunction with a chair. In FIG. 1, the chair 101 has two (2) armrests 103 and 105. Armrest cushions 107 and 113 are placed on the armrests 103 and 105. In the embodiment shown in FIG. 1, the armrest cushion 107 of the invention has straps 109 and 111 that wrap around the armrest 103 in order to secure the armrest cushion 107 to the armrest 103. Similarly, the armrest cushion 113 has straps 115 and 117 that wrap around the armrest 105 in order to secure the armrest cushion 113 to the armrest 105.

Figure 2:
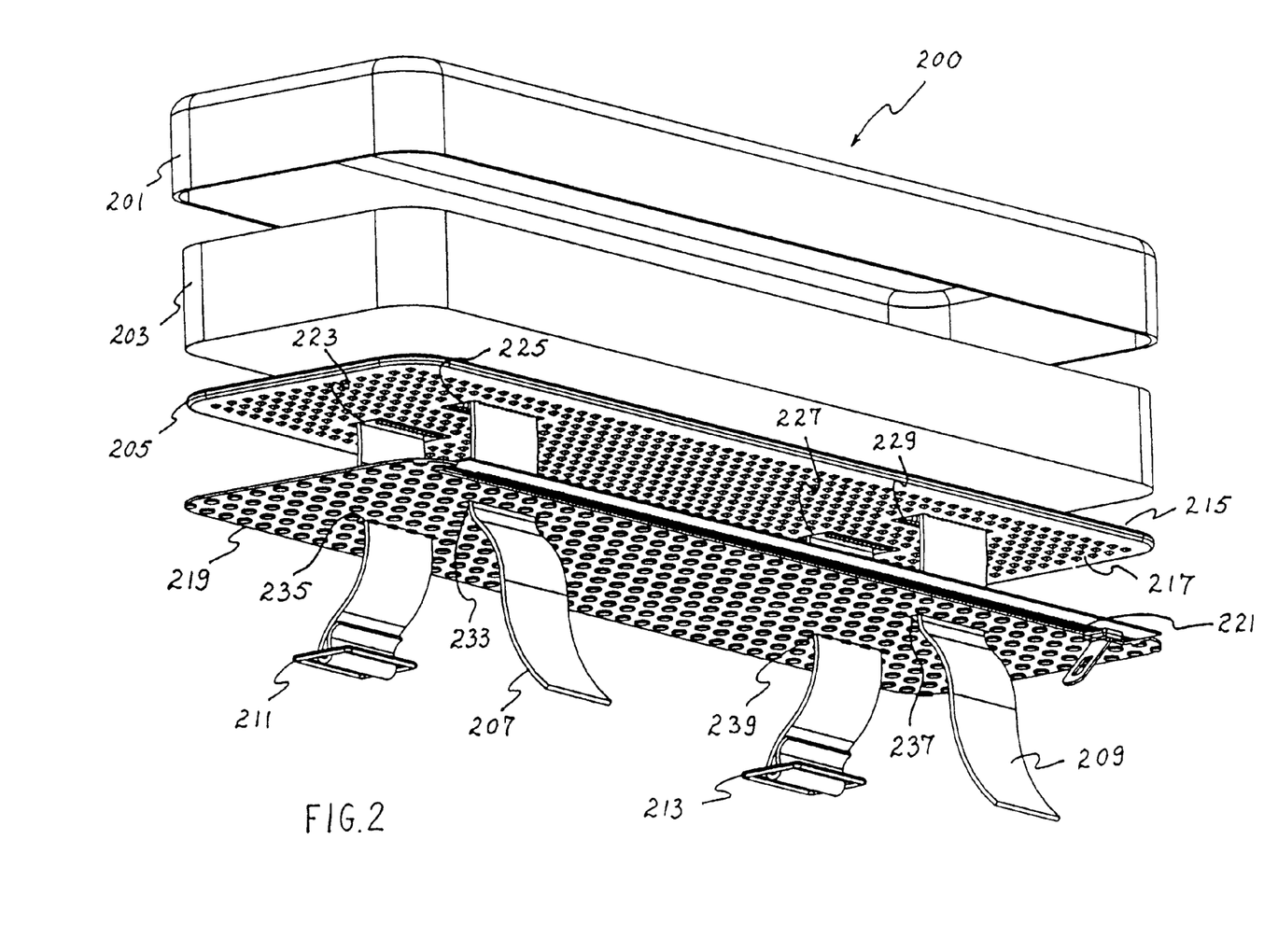
FIG. 2 is an exploded view of an armrest cushion constructed in accordance with one embodiment of the invention.

FIG. 2 is an exploded view of an armrest cushion constructed in accordance with one embodiment of the invention. The armrest cushion 200 has outer skin or covering 201, first layer 203, and second layer 205. The outer skin or covering 201 is provided to cover and protect the inner layers. In the embodiment shown in FIG. 2, the outer covering 201 has a bottom 219, and encloses the first layer 203 and second layer 205. The outer covering can be made of any soft fabric that provides comfort and softness to human contact. The first layer 203 is made of some soft material with some thickness so that when pressed down by an elbow, it provides sufficient cushion and softness to the person putting an elbow on the armrest cushion. Typically, the first layer 203 is made of foam material of some thickness that has softness and elastic quality. Any material that provides cushion support may be used as the first layer 203.

Figures 3A, 3B:
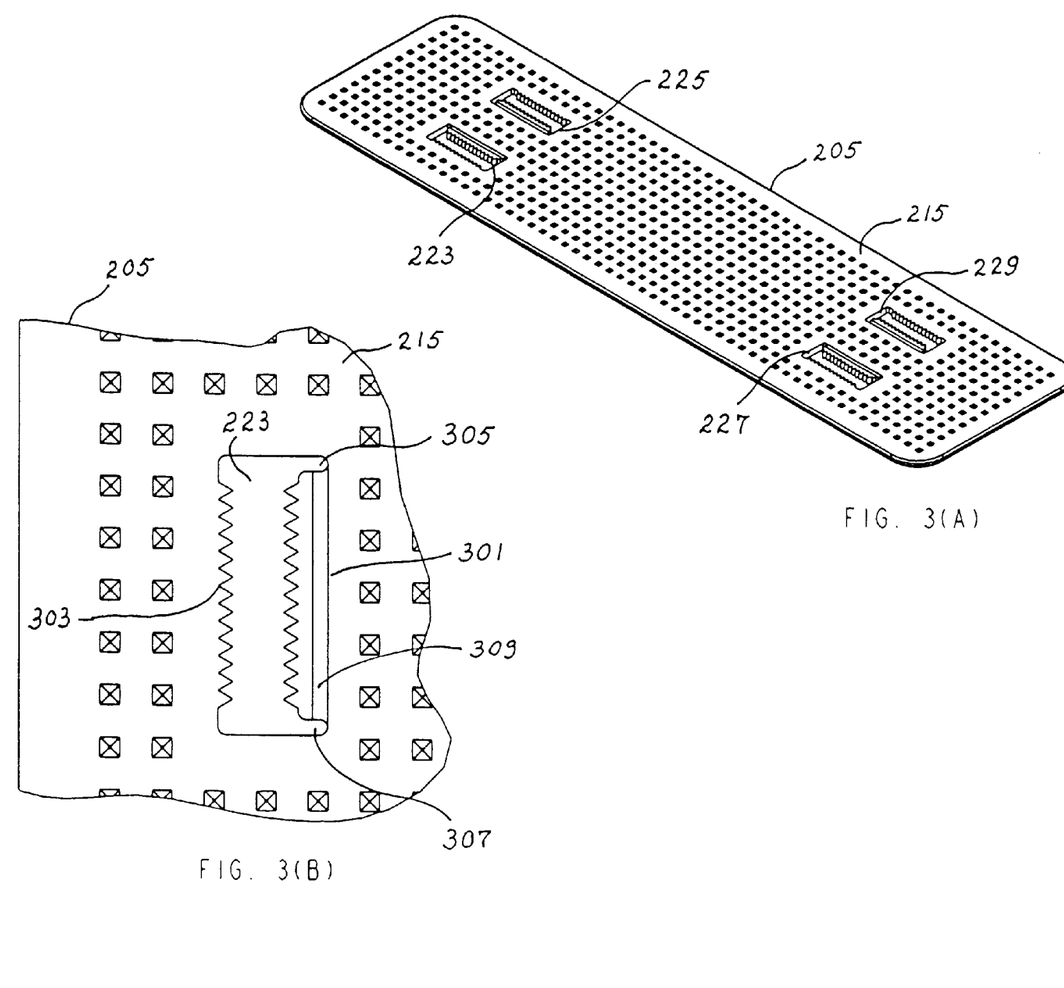
FIG. 3(A) is a top perspective view of the second layer and shows the holes in the second layer in one embodiment of the invention.
FIG. 3(B) shows a detail showing the holes in greater detail.

The second layer 205 is made of thinner and harder material so that it provides sufficient support for the whole armrest cushion, but still flexible enough to allow a little bending in order to accommodate armrest of various shapes. In one embodiment of the invention, the top and bottom surface of the second layer 205 are made to be non-slippery in order to prevent slippage. Various methods and materials can be used to provide a non-slippery surface. For example, small bumps of non-slippery material 231 may be formed on the surfaces of the second layer 205, as best shown in FIGS. 2, 3(A) and 3 (B). In an alternate embodiment, the surfaces of the second layer 205 may be filed in order to provide fine grain bumps and scratches.

In one embodiment of the invention, the top surface 215 of the second layer 205 is designed to be non-slippery so as to prevent slippage between the upper and lower layers. Various methods can be used to provide a non-slippery exterior surface. For example, small bumps 231 of non-slippery exterior may be formed on the top surface 215 of the second layer 205. In an alternate embodiment, the top surface 215 may be filed in order to provide fine grain bumps and scratches. The bottom surface 217 of the second layer 205 may also be made non-slippery in order to prevent slippage.

The bottom surface 219 of the outer covering 201 has a non-slippery exterior surface to help prevent it from slipping off the structure such as an armrest. For example, small bumps of non-slippery material may be formed on the bottom surface 219 of the outer covering 201. In an alternate embodiment, the bottom surface 219 may be filed in order to provide fine grain bumps and scratches.

In the embodiment shown in FIG. 2, the first layer 203 and second layer 205 are enclosed by the outer covering 201. The first layer 203 and second layer 205 are coextensive so that they have similar length and width when viewed from the top of the cushion 200. In FIG. 2, the first layer 203 is thicker than the second layer 205. However, it will be apparent to one skilled in the art that the first and second layers may be swapped in position so that the second layer 205 takes the position of the fist layer 203 and vice versa.

In the embodiment shown in FIG. 2, the outer covering has an opening 221 so that the first layer 103 and second layer 105 can be inserted into or removed from the covering 201. The location of the opening 221 can be anywhere on the outer covering 201 where it is convenient to insert or remove the inner layers. In one embodiment of the invention, the opening 221 has a zipper as illustrated in FIG. 2. However, it will be appreciated by one skilled in the art that other methods can be used to open and close the opening 221. For example, buttons instead of a zipper may be used to open and close the opening 221.

The straps 207 and 209 are used to secure the armrest cushion to the attached structure, for example an armchair. In the embodiment shown in FIG. 2, the straps 207 and 209 pass through holes 223, 225, 227, and 229 in the second layer 205. The bottom 219 of the outer covering 201 also has holes 233, 235, 237 and 239 to allow the straps 207 and 209 to pass through, as illustrated in FIG. 2. The straps 207 and 209 can be made of any suitable materials such as cotton, or other synthetic material. Alternatively, any other suitable tightening means may be used in place of the straps 207 and 209. For example, strings, Velcro based mechanism or rubber based mechanism may be used as tightening means in place of the straps 207 and 209.

In an alternate embodiment of the invention, the straps only pass through the bottom 219 of the outer covering 201 without passing through the second layer 205. In this alternate embodiment, the second layer 205 does not require holes to allow the straps 207 and 213 to pass through.

In operation, a user attaches the armrest cushion 200 to an armrest, for example, and fasten the straps 207 and 209 around the armrests using buckles or clamps 211 and 213 to secure the armrest cushion 200 to the armrest. Although two (2) clamps are disclosed for a strap, it will be appreciated by one skilled in the art that any proper number of straps may be used in conjunction with the invention. For example, three (3) or more (6) may be used instead of two (2). Alternatively, only one strap may be used to secure the cushion 200 to an armrest if one strap is sufficient for the purpose of securing it in view of the dimension and design of the armrest. To remove the cushion 200, the user loosens the straps 207 and 209, and removes the cushion 200 from the secured position.

Although clamps 211 and 213 are shown in FIG. 2, it will be appreciated by one skilled in the art that any other proper fastening method may be used to tighten the straps 207 and 209. For example, the straps 207 and 209 may be tightened by knotting the straps without using a clamp.

FIG. 3(A) illustrates the holes 223–229 in the second layer 205 in one embodiment of the invention. FIG. 3(B) illustrates the holes 223–229 in greater detail. In the embodiment shown in FIG. 3(B), the holes 223–229 have saw-tooth shaped edges. Also, in the embodiment shown in FIG. 3(B), the hole 223 has one edge protruding longer into the cavity than the opposite edge. For example, in FIG.3.(B), the edge 301 has recesses 305 and 307 and extends longer than the edge 303 into the cavity 223. When the armrest cushion 200 is applied to an armrest having a round cross-section, the longer edge 301 will bend and fit the contour of the round armrest, allowing the rest of the second layer 205 to remain flat enough to provide support for the user. In yet another embodiment of the invention, the second layer 205 has grooves 309 cut partially into the second layer in order to further facilitate the bending of the edge 301.

Figure 4:
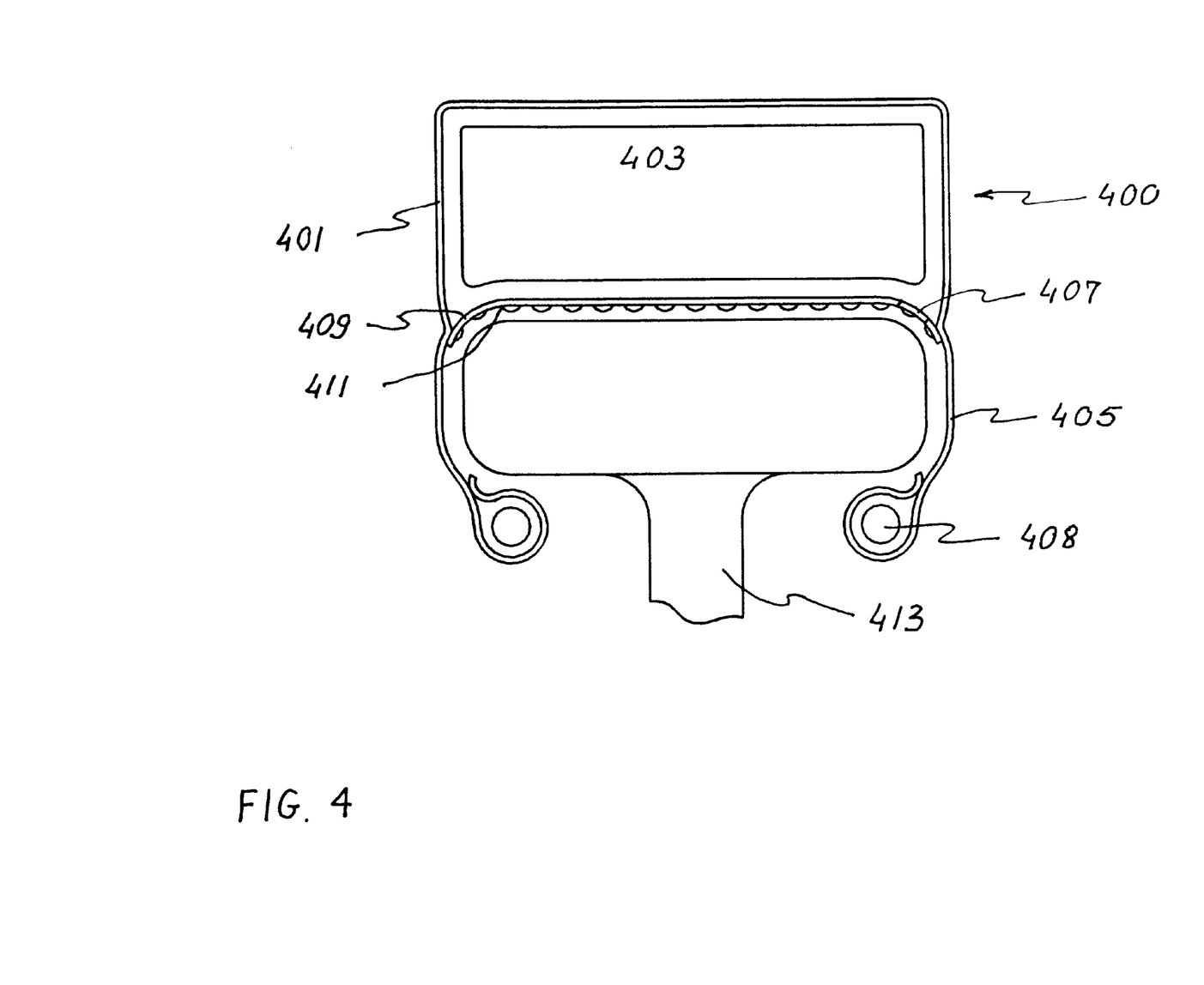
FIG. 4 illustrates a cross-sectional view of an alternate embodiment of armrest cushion of the invention.

FIG. 4 illustrates a cross-sectional view of an alternate embodiment of armrest cushion of the invention. The armrest cushion 400 comprises outer covering 401, inner layer 403, and skirt 405. Similar to the embodiment shown in FIG. 1 the outer covering 401 can be made of any soft fabric that provides comfort and softness to human contact. The inner layer 403 is made of some soft material with some thickness so that when pressed down by an elbow, it provides sufficient cushion and softness to the person putting an elbow on the armrest cushion. Similar to the first layer 203, the inner layer 403 is made of foam material of some thickness that has softness and elastic quality.

The bottom part 409 of the outer covering 401 has a surface 411 made of non-slippery material to help prevent slipping of the armrest cushion 400 off the structure such as an armrest. For example, small bumps of non-slippery exterior may be formed on the bottom surface 411. In an alternate embodiment, the bottom surface 411 may be filed in order to provide fine grain bumps and scratches.

As shown in FIG. 4, the inner layer 403 is enclosed by the outer covering 401. The outer covering 401 has an opening 407 so that the inner layer 403 can be inserted into or removed from the covering. The opening 407 can be located anywhere on the outer covering 401 where it allows to insert the inner layer 403 into, and remove the inner layer 403 from, the outer covering 401. In one embodiment of the invention, the opening 407 has a zipper so that insertion or removal of layers can be achieved quickly and efficiently. It will be appreciated by one skilled in the art that other methods can be used to implement the opening 407. For example, buttons or Velcro based mechanism instead of a zipper may be used to open and close the opening 407. Alternatively, the opening 407 may be closed by overlapping sheets of cloth attached to the outer covering 401 without using a zipper, or other closing mechanisms.

The embodiment shown in FIG. 4 dose not use straps 207 and 209. Instead, the outer covering 401 has a skirt 405, which attaches to the outer covering 401 so that it at least partially extend over the armrest 413. The skirt 405 has on its fringe a passageway for a string 408 so that it holds and passes the string 408, which can be tightened and fastened to secure the armrest cushion to the armrest 413. In one embodiment of the invention, the passageway for the string 408 may be created by stitching or seaming. It will be apparent to one skilled in the art that any other suitable method can be used in conjunction with the invention to pass and hold the strap around the fringe of the skirt 405.

The string 408 can be tightened and fastened using a clamp or any other suitable method such as simple knotting. In alternate embodiments of the invention, other types of tightening means may be used in place of the string 408. For example, a string, rubber based tightening means or Velcro based tightening means, or any other suitable methods can be used to secure the skirt 405 on the armrest. In yet another embodiment of the invention, any combination of a strap, string, Velcro, rubber can be used as the tightening means.

The alternate embodiment in FIG. 4 is flexible and accommodating of various sized and shaped armrests and structures. For example, if the length of the armrest 413 is shorter then the length of the cushion 400, the user can still use and enjoy the cushion 400 by placing the cushion 400 on the small size armrest and secure the cushion on the armrest by tightening the strap 404. Tightening the string 408 on a smaller size armrest causes the cushion end portions to bend and wrap around the end side of the armrest. Depending on the placement of the cushion 400 and the shape of the smaller size armrest, it is possible for either end portion or both end portions to be bent.

Figures 5A, 5B:
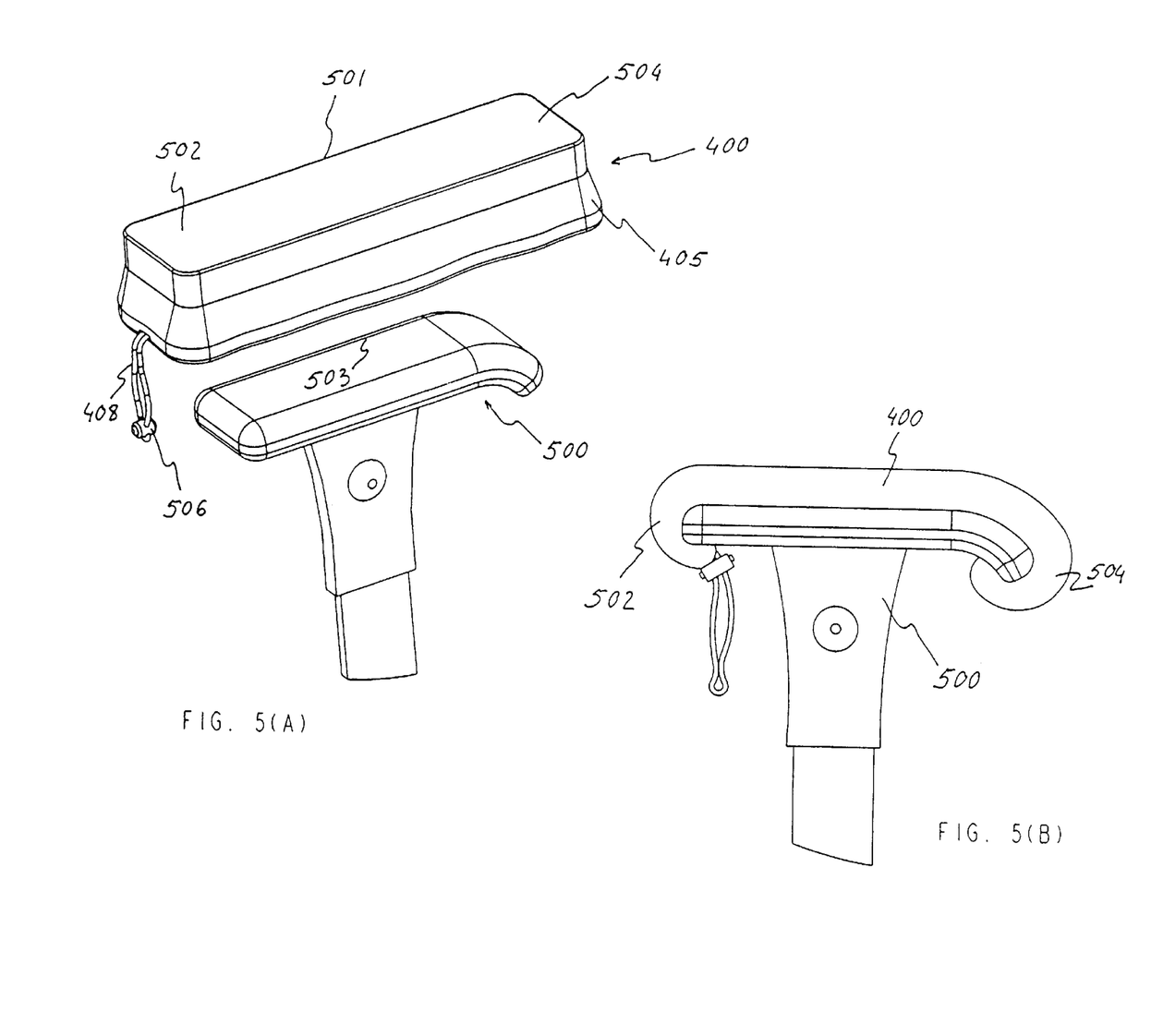
FIG. 5(A) illustrates the cushion of the invention in conjunction with a small size armrest.
FIG. 5(B) illustrates the cushion of the invention applied to the armrest.

FIG. 5(A) illustrates the cushion of the invention in conjunction with a small size armrest. In FIG. 5(A), the side length 501 of the armrest cushion 400 is larger then the side length 503 of the armrest 500. Unlike conventional armrest cushions, the armrest cushion 400 of the invention allows proper fitting on the small armrest 500 so that the user may use the same armrest cushion 400 on different-shaped and sized armrests without having to modify or break the cushion or having to purchase a new cushion. With conventional cushions,-when the larger size cushion is placed on the smaller sized armrest, the end portions such as 502 and 504 will be left without vertical support and will be left dangling in midair, creating potential hazard of causing injuries or at least inconvenience to the users. In contrast, the cushion 400 of the invention allows the end portions 502 and 504 to bend and wrap around the side ends of the smaller armrest 500 so that there is much better fitting of the armrest cushion 400.

FIG. 5(B) illustrates the cushion 400 of the invention applied to the armrest 500. In FIG. 5(B), the flexibility of components of the armrest cushion 400 and the overall design allow the end portions 502 and 504 of the cushion 400 to bend and wrap around the side ends of the armrest 500 without breaking or damaging the armrest or losing cushion support.

Specifically, the outer covering 401 and inner layer 403 are sufficiently flexible to allow bending on end portions 502 and 504 of the armrest cushion 400 and wrap around the both ends of the small armrest 500, as illustrated in FIG. 5(B). The bending of the cushion 400 on end portions 502 and 504 allows the cushion 400 to fit better on the smaller-sized armrests and prevents cushion end portions 502 and 504 from unnecessarily protruding and dangling without vertical support underneath, so that the user may feel more comfortable and have better support using the cushion 400.

In operation, the user places the cushion 400 on the armrest 500 and tightens or pulls the string 408, causing the cushion 400 to bend and wrap around on side ends. The user can secure the cushion 400 by adjusting the buckle or tightening clamp 506.

One benefit of providing skirt 405 is that it shields the outer covering 401 from the effect of tightening string 408. By providing attaching a skirt having a string, the invention shields the inner layer 403 from the tension and pressure caused by tightening of the string 408, thus maintaining the softness of cushion. When the user tightens the string 408, the cushion 400 dose not lose, but maintains the original cushion softness because the size of the space inside the outer covering 401 is relatively unaffected by the tightening so that the outer covering 401 provides space large enough to hold the inner layer 403 without compressing it even when the end portions 502 and 504 may bend, thereby allowing the inner layer to maintain its softness.

It will be apparent to one skilled in the art, that the invention can be used in conjunction with any suitable types of chairs such as computer chairs, wheelchairs, bench chairs, and automobile armrests. Further, although an armrest cushion has been described in conjunction with an armrest of a chair, it will be apparent to one skilled in the art that the invention can be used for any other suitable purpose and application than chairs. For example, the cushion of the invention may be applied where there is a need to provide cushion support without involving an armrest.

While there is shown and described herein certain specific structure embodying the invention, it will be apparent to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A cushion for removable attachment to the arm of a chair, the cushion comprising:
   an outer covering;
   a first layer;
   a second layer, wherein said first layer and second layer are enclosed in said outer covering; and
   a plurality of straps to detachably attach the cushion to the arm of the chair, wherein the plurality of straps are attached to the second layer, wherein the covering has a plurality of holes to allow said plurality of straps to pass through.

2. The cushion of claim 1 wherein said first layer is made of a soft material to provide cushion support.

3. The cushion of claim 2 wherein said second layer is thinner and made of a harder material than said first material.

4. The cushion of claim 1 wherein said second layer has a plurality of holes to allow said plurality of straps to pass therethrough.

5. The cushion of claim 4 wherein said plurality of holes of said second layer have saw-toothed shaped edges.

6. The cushion of claim 5 wherein said second layer comprises a plurality of grooves to facilitate bending of said second layer.

7. The cushion of claim 6 wherein said saw-tooth shaped edges are disposed such that a first edge extends longer into a hole of said second layer than a second edge.

8. A cushion for removable attachment to an arm of a chair, the cushion comprising:
   an outer covering having a lower portion with a surface that is made of a non-slippery material;
   a first layer;
   a second layer having a non-slippery surface, wherein said first layer and second layer are enclosed in said outer covering; and
   means to detachably attach the cushion to the arm of the chair, wherein the attachment means are detachably connected to the second layer.

9. The cushion of claim 8 wherein said surface of said second layer has non-slippery bumps located thereon to prevent slipperiness.

10. A cushion for removable attachment to an arm of a chair, the cushion comprising:
    an outer covering;
    a cushion member;
    a support layer, wherein said cushion member and said support layers are enclosed in said outer covering; and
    tightening means;
    wherein said outer covering has a plurality of holes to allow said tightening means to pass through and said support layer has a plurality of holes to allow said tightening means to pass through.

11. The cushion of claim 10 wherein said tightening means comprises a plurality of straps.

12. The cushion of claim 10 wherein said plurality of holes of said support layer have saw-tooth shaped edges.

13. A cushion for removable attachment to an arm of a chair, the cushion comprising:
    an outer covering;
    a cushion member;
    a support layer, which is stiffer than said cushion member, wherein said cushion member and said support layers are enclosed in said outer covering; and
    a plurality of straps;
    wherein said outer covering has a plurality of holes to allow said plurality of straps to pass through, and said support layer has a plurality of holes to allow said plurality of straps to pass through.

14. A cushion for removable attachment to an arm of a chair, the cushion comprising:
    an outer covering having a lower portion with a plurality of holes;
    a first, cushioned layer;
    a second, stiffer layer with a plurality of holes, where the first cushioned layer and second stiffer layer are at least partially enclosed in said outer covering; and
    strap means to detachably attach the cushion to the arm of the chair, the strap means engaging with the second, stiffer layer by passing through the plurality of holes therein and through the plurality of holes in the outer covering, so as not to compress the first cushioned layer.

15. The cushion of claim 15 wherein a lower portion of said outer covering is made of a non-slippery material.

* * * * *

UNITED STATES PATENT AND TRADEMARK OFFICE
CERTIFICATE OF CORRECTION

PATENT NO. : 6,578,914 B2
DATED : June 17, 2003
INVENTOR(S) : Albert Artsvelyan

It is certified that error appears in the above-identified patent and that said Letters Patent is hereby corrected as shown below:

<u>Column 7,</u>
Line 17, delete "material" and insert -- layer --

<u>Column 8,</u>
Line 4, delete ";" after the word "covering"
Line 42, delete "15" and insert -- 14 --. Insert -- surface of the -- after "wherein a"

Signed and Sealed this

Ninth Day of March, 2004

JON W. DUDAS
*Acting Director of the United States Patent and Trademark Office*